March 6, 1951  H. E. SHANKWEILER  2,544,617
BORING AND DRILLING APPARATUS
Filed Nov. 18, 1946  2 Sheets-Sheet 1

INVENTOR.
HIRAM E. SHANKWEILER
BY Stanley Hovde
ATTORNEY

INVENTOR.
HIRAM E. SHANKWEILER
BY
ATTORNEY

Patented Mar. 6, 1951

2,544,617

UNITED STATES PATENT OFFICE 2,544,617

BORING AND DRILLING APPARATUS

Hiram E. Shankweiler, Chicago, Ill., assignor to Rollin H. Williams, Chicago, Ill.

Application November 18, 1946, Serial No. 710,444

2 Claims. (Cl. 77—25)

1

The present invention relates to machines for performing boring and drilling operations in which a series of tool supporting spindles are so arranged in a revolving frame or turret that they can be brought successively into operative engagement with a driving spindle.

More specifically, this invention is concerned with a machine of this character for attachment to a drill press whereby a work piece requiring successive operations, such as drilling, counter-boring, counter-sinking, reaming, spot-facing and other drill press operations, may be performed at one setting of the work.

It is an object of this invention to provide a revolving frame or turret which is so arranged that the indexing movement to bring the various tools successively into operative position relative to a work piece is obtained automatically as the driving spindle is retracted from operative position to inoperative position.

It is also an object of this invention to provide a device of this type which is simple, compact and closely organized in construction, reliable and efficient in operation, easily manipulated, and easy and comparatively inexpensive to manufacture.

Other objects and advantages reside in certain novel features of the construction, arrangement and combination of parts, which will be hereinafter more fully described and particularly pointed out in the appended claims, reference being had to the accompanying drawings forming a part of this specification, and in which:

Figure 1:
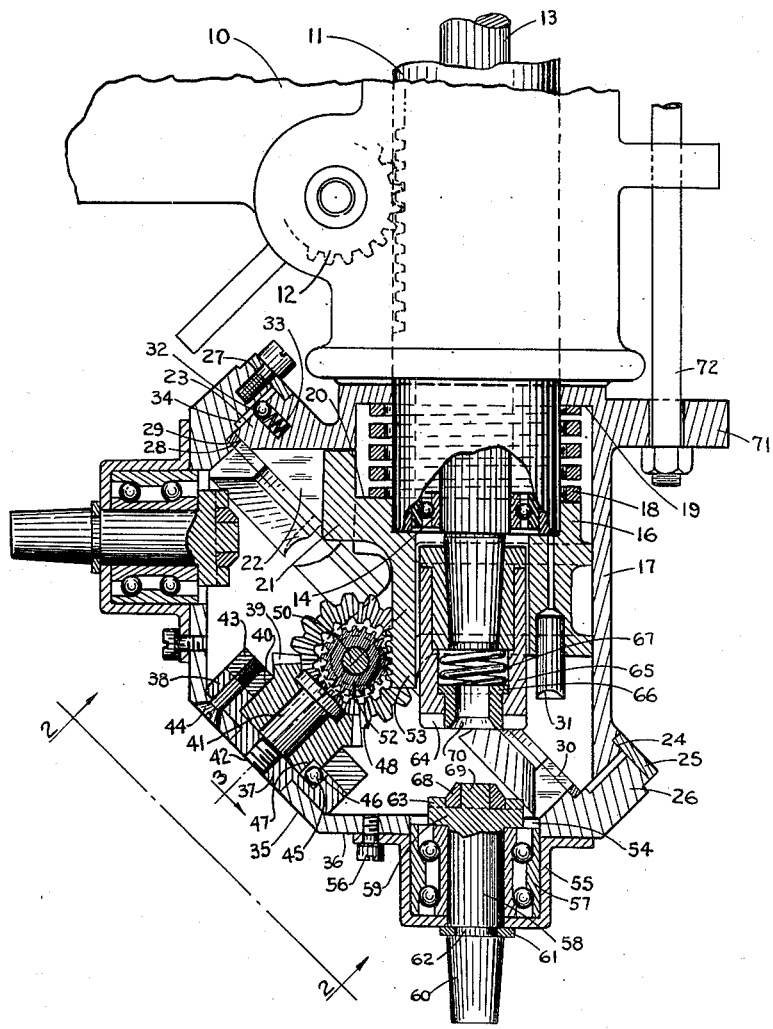
Fig. 1 is a fragmentary view, partly in side elevation and partly in central vertical section, showing a multiple tool turret combined with a drill press, and illustrating the driving spindle in raised inoperative position relative to a tool supporting spindle carried by the turret and in coaxial alignment with said driving spindle.

Reference being had more particularly to the drawings, the numeral 10 indicates the head of a drill press and 11 represents a drill press quill supported therein for rising and falling movement under control of operating mechanism indicated generally at 12. A driving spindle 13 is revolubly mounted in the quill 11 by means of bearings 14. Fastened to the lower end of the quill 11 by means of a screw 15 is a clamp 16. An upper housing member 17 encloses the lower end of the quill 11 and the clamp 16. A coil spring 18 acting upwardly against an internal annular shoulder 19 on the housing member 17 and acting downwardly against a similar shoulder 20 on the clamp 16 is operative to maintain the housing member 17 in upwardly forced position against the lower limits of the drill press head 10. The housing member 17 is supported in non-rotative position on the quill 11 by means of a key 21 projecting upwardly from the quill clamp 16 with which a notch or recess 22 in the member 17 is vertically aligned. Downward movement of the housing member 17 relative to the quill 11 is also limited by the upper limits of the key 21, when the upper limits of the recess 22 is engaged thereby. A peripheral enlargement at the lower end of the housing member 17 in the form of a circular flange 23 is provided with an annular upwardly facing bearing surface 24 in a plane disposed at an angle of 45 degrees to the longitudinal axis of the quill 11.

A ring or gib 25 cooperating with and revolvably supported on the bearing surface 24 has a frame or turret 26 attached thereto as at 27 whereby the turret 26 is adapted to revolve about an axis disposed at an angle of 45 degrees to the longitudinal axis of the quill 11. An internal annular shoulder 28 formed in the turret 26 supports a ring 29 to provide a bearing with which the lower edge of the flange 23 of the housing member 17 has rotary sliding engagement. Axially aligned recesses 30 formed at uniformly spaced intervals in the inner periphery of the ring 29 and the surface of the turret 26 overlapped by the ring 29 provide sockets which are adapted to selectively receive a locking pin 31 fastened to and projecting downwardly from the clamp 16 with its axis parallel to the axis of the quill 11 for movement in unison with the quill 11 toward and away from a position in engagement with a selected recess 30. The locking pin 31 is accordingly set well away from the axis of rotation of the turret 26 to insure great accuracy in locating the turret 26, whereby said recesses 30 and the locking pin 31 cooperate to successively bring a series of tool carrying spindles arranged on the turret 26, as hereinafter more particularly set forth, into accurate coaxial alignment with the driving spindle 13. Spring pressed balls 32 arranged in radial sockets 33 provided in the housing member 17 cooperate with individual recesses or notches 34 formed at uniformly spaced intervals about the wall of the turret 26 opposite thereto for the purpose of releasably detaining the turret 26 in a position wherein a selected tool carrying spindle supported thereon is in coaxial alignment with the driving spindle 13.

Figure 2:
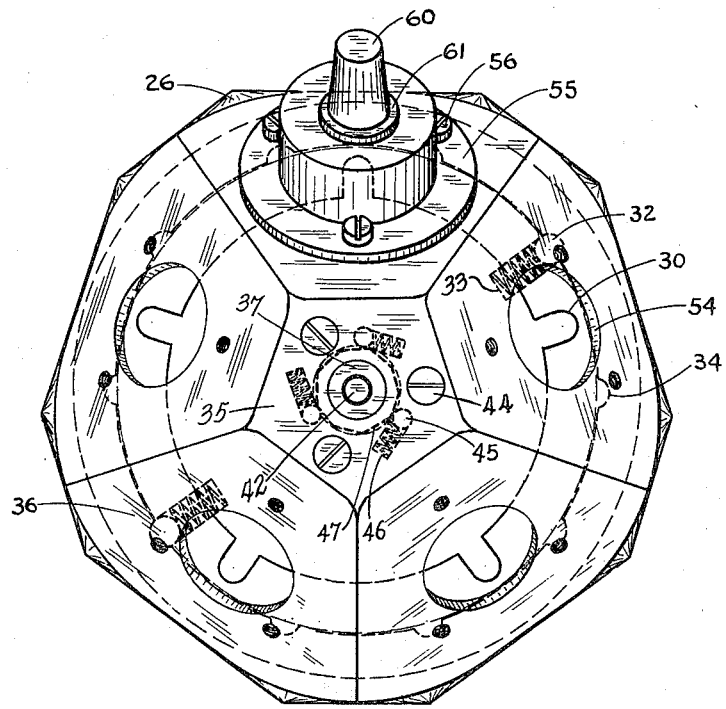
Fig. 2 is a view in end elevation of the turret as viewed in the direction of the arrows 2—2 in Fig. 1, with portions of certain elements being removed for the purpose of illustration.

As shown in Fig. 2, the turret 26 has a central wall portion 35 substantially perpendicular to its axis of rotation while the area surrounding the wall portion 35 is divided to form a series of radially widening faces 36 of uniform size and in planes of such angularity to the wall portion 35 as to cause each of said faces 36 to occupy a plane perpendicular to the longitudinal axis of the driving spindle 13, by rotation of the turret 26. The wall portion 35 is pierced to provide a central opening for the reception therein of a central boss 37 forming part of a plate 38 engaging the inner surface of the wall portion 35 surrounding said central opening. A miter gear 39, having a hub or shaft portion 40 seated in a central recess formed in the inner face of the plate 38 is supported for rotation about said hub 40 as an axis by means of a stud 41 having a threaded end 42 secured to the boss 37 whereby the gear 39 is positioned to rotate about an axis coincident with the axis of rotation of the turret 26. A ring 43 fastened to the wall portion 35 by means of a series of screws 44 passing through the plate 38 has an inner periphery of such dimension as to form an axial extension of the central recess in the plate 38. Spring pressed ball bearings 45 arranged in sockets 46 opening inwardly from the plate 38 for guiding the bearings 45 in paths tangent to a circle defined by the path of rotation of the gear hub 40 ride idly over flat areas 47 to permit turning of the gear 39 relative to the plate 38 in one direction of rotation of the gear while said bearings 45 operate to obstruct rotation of the gear in an opposite direction, thereby causing the plate 38 and the turret 26 to rotate in unison in the manner of a one-way clutch. Accordingly, rotation of the gear 39 in a counter-clockwise direction as viewed in Fig. 2, will cause the ball bearings 45 to be engaged to bring about counter-clockwise rotation of the turret 26. Since the bearings 45 ride idly over the flat areas 47 of the gear 39 when the gear 39 is rotated in the opposite direction, the turret 26 may be manually turned independently of the gear 39 in a clockwise direction as viewed in Fig. 2.

Figure 4:
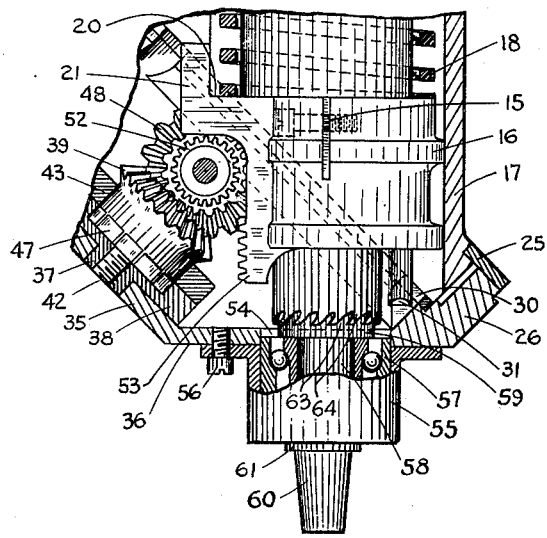
Fig. 4 is a fragmentary view similar to Fig. 1, illustrating the driving spindle in lowered operative position relative to a tool supporting spindle carried by the turret, with parts in side elevation for the purpose of illustration.
Figure 3:
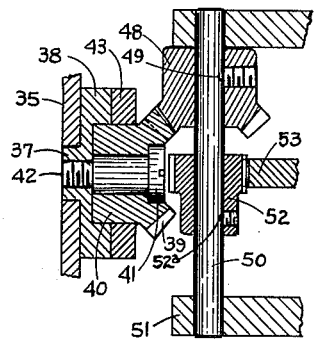
Fig. 3 is a fragmentary view partly in side elevation and partly in central vertical section, taken on line 3—3 of Fig. 1.

Meshing with the gear 39, as shown in Fig. 3, is a gear 48 fixed as at 49 to a shaft 50 having bearing support in spaced and parallel arms 51 formed in and projecting downwardly from the housing member 17. The shaft 50 is driven to rotate the gear 48 by means of a spur gear 52 secured as at 52a to the shaft 50. The spur gear 52 extends into the path of a rack 53 formed integrally with the clamp 16 whereby upon upward movement of the quill 11 from a depressed operating position, as shown in Fig. 4, to a raised inoperative position, as shown in Fig. 1, the gear 52 is automatically revolved a distance commensurate with rotation of the gears 48 and 39 to turn the latter and the turret 26 in a counter-clockwise direction, as viewed in Fig. 2, or as viewed from the left hand side of Fig. 3, from a position wherein a selected face 36 of the turret 26 is in a plane perpendicular to the axis of the quill 11 to a position wherein a succeeding face 36 is in such position relative to the axis of the quill.

An opening 54 formed centrally in each face 36 of the turret 26, and a cap 55 secured by screws 56 to said face 36 and forming an outward extension of the edges of said opening 54, provides a retainer for a double row shielded bearing assembly 57. The latter provides a mounting for a rotating tool supporting spindle 58 having an enlarged head portion 59 projecting inwardly beyond the inner surface of the turret face 36, and having a tapered shank 60 projecting outwardly through an opening in the base of the cap 55, which shank is adapted to engage the chuck of a suitable tool (not shown). A retaining ring 61 fitted in a transverse groove 62 formed in the body of the spindle 58 acts against the base of the cap 55 and the head portion 59 acts against the inner limits of the bearing assembly 57 to prevent relative axial movement of the spindle 58.

It will therefore be manifest that revolution of the turret 26 to cause the tool supporting spindles 58 to be brought successively toward and away from a position in coaxial alignment with the quill 11 and the driving spindle 13, is obtained by the upward movement of the quill 11 and the driving spindle 13 from an operative position to an inoperative position, through the cooperation of the rack 53 on the quill clamp 16 and the gears 52, 48 and 39.

A series of teeth 63 formed in the periphery of each spindle head 59 are adapted to be interengaged with a series of teeth 64 provided on the lower end of a driving shell 65 secured to the driving spindle 13, when the quill 11 and the driving spindle 13 are lowered into operative position as shown in Fig. 2. A driver member 66 is supported in the lower end of the driving shell 65 for rotary movement in unison with the latter but movable axially inwardly from an outward position as shown in Fig. 1 against the yieldable resistance of a spring 67. A frustoconical bearing 68 secured to an axially inwardly extending stem 69 provided on the spindle head 59 of each spindle 58 is adapted to have snug fitting engagement with the tapered internal wall surface 70 of the spring pressed driving member 66 preliminary to a position of interengagement of the teeth 63 and 64 of the spindle head 59 and driving shell 65, respectively, whereby accurate alignment of the parts, during such process of interengagement, is definitely assured.

A lug 71 extending laterally from the upper end of the housing member 17 is provided with a bore for the reception of an upright depth gauge rod 72.

While the foregoing description embraces a preferred embodiment of the present invention, it will be readily apparent that various changes may be made in the form, construction and arrangement of the parts thereof without departing from the spirit or scope of the invention or sacrificing any of its material advantages.

What is claimed is:

1. In an apparatus for performing boring and drilling operations, the combination of a fixed support having a quill mounted thereon for movement between retracted and projected positions relative to said support, a driving spindle journaled in said quill, means detachably connected to said quill including a toothed rack extending lengthwise of the path of movement of the quill, a turret, a stationary bearing member carried by said support on which said turret is mounted for rotation, a shaft supported on said bearing member for rotation about an axis perpendicular to the axis of rotation of the turret, a pinion supported on said shaft for interengagement with said toothed rack to drive said shaft, a gear mounted on said turret for relative rotation about an axis coincident with the axis of rotation of the turret, said turret and said gear having cooperating parts effective to cause rotation of the turret in unison with the gear when the latter is traveling in only one direction, and means cooperating with said gear and said shaft to effect rotation of said gear in a direction to rotate the turret in unison therewith upon movement of the quill from a projected to a retracted position, and a series of tool carrying spindles individually rotatably supported on said turret adapted to be successively positioned in axial alignment with said driving spindle upon rotation of the turret.

2. In an apparatus for performing boring and drilling operations, the combination of a fixed support having a quill mounted thereon for movement between retracted and projected positions relative to said support, a driving spindle journalled in said quill, means detachably connected to said quill including a toothed rack extending lengthwise of the path of movement of the quill, a turret, a stationary bearing member carried by said support on which said turret is mounted for rotation, about an axis at an angle of 45 degrees to the axis of movement of the driving spindle, a shaft supported on said bearing member for rotation about an axis perpendicular to the axis of rotation of the turret, a pinion supported on said shaft for interengagement with said toothed rack to drive said shaft, a gear mounted on said turret for relative rotation about an axis coincident with the axis of rotation of the turret, said turret and said gear having cooperating parts effective to cause rotation of the turret in unison with the gear when the latter is traveling in only one direction, and means cooperating with said gear and said shaft to effect rotation of said gear in a direction to rotate the turret in unison therewith upon movement of the quill from a projected to a retracted position, and a series of tool carrying spindles individually rotatably supported on said turret adapted to be successively positioned in axial alignment with said driving spindle upon rotation of the turret.

HIRAM E. SHANKWEILER.

REFERENCES CITED

The following references are of record in the file of this patent:

UNITED STATES PATENTS

| Number | Name | Date |
| --- | --- | --- |
| 457,967 | Hartness | Aug. 18, 1891 |
| 1,924,383 | Stampfli | Aug. 29, 1933 |
| 2,364,631 | Grimes | Dec. 12, 1944 |